Jan. 20, 1959 R. F. BANG 2,869,448
BACKING PLATE FOR A PHOTOLITHOGRAPHIC CHASE
Filed Feb. 18, 1957
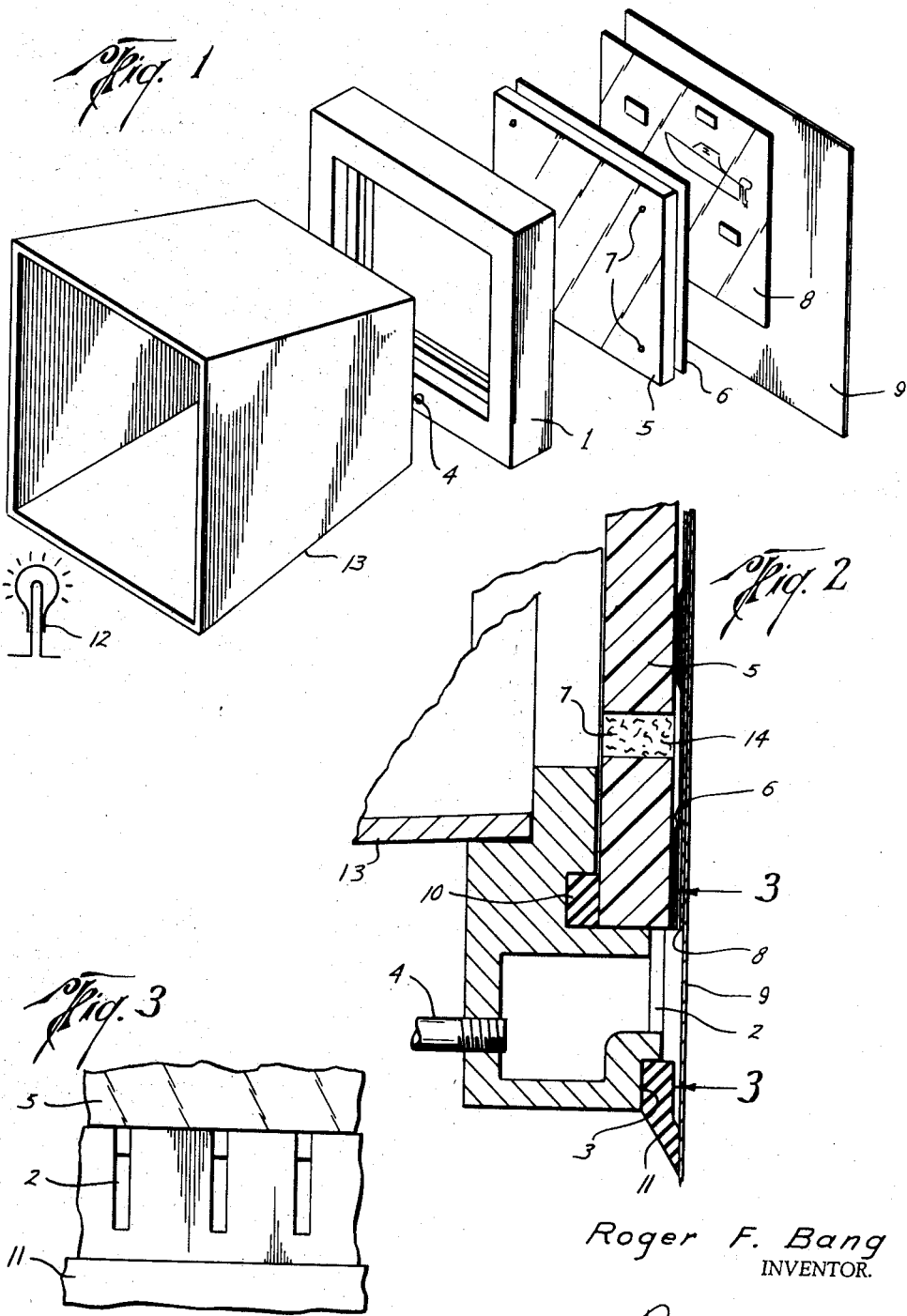
Roger F. Bang
INVENTOR.
BY *Ransler O. Wyatt*
ATTORNEY

United States Patent Office 2,869,448
Patented Jan. 20, 1959

2,869,448
BACKING PLATE FOR A PHOTOLITHOGRAPHIC CHASE

Roger F. Bang, Houston, Tex.

Application February 18, 1957, Serial No. 640,653

3 Claims. (Cl. 95—76)

This invention relates to new and useful improvements in a backing plate for a photolithographic chase.

It is an object of this invention to provide a backing plate for use in a chase of a photolithograph plate producing machine of novel construction.

In plate making methods commonly employed, the photolithographic plate is made from a negative. It is often necessary to place strips of red adhesive tape and orange masking tape on the negative to eliminate portions of the negative and when the plate glass of the chase is brought into contact with the negative, the high points caused by such tape holding the glass away from the negative permits light to undercut the image which in turn causes spread images and thus destroys the usefulness of the plate. It is an object of this invention to provide a chase having a plastic sheet in lieu of the plate glass sheet now employed, and mounting a thin strip of flexible plastic material on the contact side of the sheet, designed to mold itself around the projections of the strips of tape, so that a close contact is made between the negative and the plate, thus eliminating light leakage and providing an accurate and sharp image on the plate.

It is still a further object of the invention to provide a chase of durable qualities, less susceptible to breakage, having novel means for forming a close fit with a negative.

With the above and other objects in view, the invention has relation to certain novel features of construction, operation and arrangement of parts more particularly defined in the following specifications and illustrated in the accompanying drawings, wherein:

Figure 1 is an exploded view of the photocopy mechanism.

Figure 2 is a side elevational view, in section, as the assembly, and

Figure 3 is a sectional view taken on the line 3—3 of Figure 2.

Referring now more particularly to the drawings, the numeral 1 designates a chase having a plurality of ports 2, 2 and having a marginal shoulder 3 forming a groove. Suitable air hoses, or conduits, as 4 are provided to connect with said ports.

In lieu of the usual plate glass backing member, a sheet of rigid plastic, such as plexiglass, 5, is employed. Secured to the margins of said sheet 5, as by cementing, is the thin pliable and elastic sheet 6 of plastic material, preferably four gauge plastic sheeting. A plurality of perforations, such as the perforations 7, 7 are formed in the sheet 5 adjacent the corners thereof, and inside the cemented margin.

In use the negative, as 8, is placed against the sheet 6 of the backing plate 5 and the plate 5 is secured in the chase 1, abutting against a gasket as 10, and the chase is mounted in the photo composing machine 11, with the metal plate 9 abutting the negative. A vacuum pump (not shown) draws the air from between the backing plate 5 and the negative, through the ports 2, 2, causing the negative to fit closely against the plates 5 and 9 and the thin sheeting of plastic 6 will be drawn tightly against the negative, and yields, stretching around the edges of any tape or other raised substance on the negative. Suitable filters as cotton wads 14 may be packed in the ports 7 to keep foreign matter from between the negative and plate.

When the lamp, as 12, of the composing machine is turned on and directed through the light tunnel 13, against the backing plate 5, the rays will penetrate the negative 8 and will not be deflected by light leaks around the tape or other projection on the negative, and will consequently produce a true duplication of the negative on the plate 9. When the backing plate 5 is released from the chase 1, the thin elastic sheet 6 will return to its normal shape and the plate 5 is ready for reuse.

While the foregoing is considered a preferred form of the invention, it is by way of illustration only, the broad principle of the invention being defined by the appended claims.

What I claim is:

1. In a backing plate for use in a chase of a photo composing machine for lithograph plate production, a sheet of transparent rigid plastic, a flexible sheet of thin transparent plastic sheeting of the same dimensions as the rigid sheet anchored at its margins to the margins of the rigid sheet and on the side of the rigid sheet abutting the negative to be reproduced and a plurality of air escape ports through said rigid sheet inside of said anchored margins.

2. In a backing plate for use on photocomposing machines for lithograph plate making, a body of rigid plastic having a flexible plastic sheet mounted on one face in position to contact a negative, and secured at the margins thereof, and means for drawing off entrapped air from between said plate and sheet.

3. In a backing plate for use on photocomposing machines for lithograph plate making, a body of rigid plastic having a flexible plastic sheet mounted on one face at the margins thereof, said flexible sheet being in position to contact a negative to be reproduced and to yield to follow the contours thereof ports extending through said rigid body for drawing entrapped air from between said sheet and rigid body, and filter packing in said ports.

References Cited in the file of this patent

UNITED STATES PATENTS

| 683,059   | McCaslin | Sept. 24, 1901 |
| 1,096,640 | Noetzel  | May 12, 1914   |
| 1,493,677 | Jones    | May 13, 1924   |
| 1,510,007 | Koppe    | Sept. 30, 1924 |
| 2,173,168 | Hughes   | Sept. 19, 1939 |

FOREIGN PATENTS

| 409,589 | Germany | Jan. 9, 1923  |
| 806,629 | Germany | June 14, 1951 |